United States Patent Office 3,575,720
Patented Apr. 20, 1971

3,575,720
INSULATOR MEANS FOR LITHIUM-CHLORINE
HIGH TEMPERATURE BATTERY
Gale M. Craig, Anderson, Ind., assignor to General
Motors Corporation, Detroit, Mich.
Filed Feb. 3, 1969, Ser. No. 795,961
Int. Cl. H01m 29/04
U.S. Cl. 136—86
5 Claims

ABSTRACT OF THE DISCLOSURE

Substantially environmentally inert electrical insulators and insulated conductors for use in the Li|LiCl|Cl$_2$ electrochemical system. The insulators and conductors are composites having Cl$_2$-inert and Li-inert barriers which shield vulnerable composites from chlorine or lithium attack. Specific material disclosed include combinations of aluminum nitride, carbon, graphite, molybdenum, Kovar and stainless steel.

---

The invention herein described was made in the course of work under a contract with the Department of the Navy.

This invention relates generally to high-temperature batteries of the lithium|lithium chloride|chlorine, fused salt electrolyte type and more particularly to cells of this type employing insulator means and insulated conductor means which are substantially environmentally-inert. Substantially environmentally-inert devices, as the expression is used herein, are devices which sufficiently resist the chemical and physical influences of the lithium, lithium chloride and chlorine so as to permit meeting the mission requirements of the cells in which they are used without significant impairment or degradation of the device structurally or electrically.

One of the principal problems associated with lithium| lithium chloride|chlorine, fused salt electrolyte electrochemical cells is that of compatibility between the materials of construction and the extremely chemically active and corrosive environment. This is especially true with respect to conductors and insulators. Materials which are resistant to Cl$_2$ gas, lithium chloride and lithium at about 700° C. are needed. Ceramic oxides such as alumina and beryllia are generally compatible with chlorine gas at 700° C. but are electrically incompatible with the Li-LiCl environment, as will be discussed hereinafter. The Li-LiCl environment results from the dissolution of pure lithium in the LiCl electrolyte in the electrolyte region of the cell. Aluminum nitride is more electrically compatible with the Li-LiCl environment than the ceramic oxides, but unlike the ceramic oxides is vulnerable to chlorine attack. The 316 and 304 stainless steels, molybdenum and Kovar are chemically compatible with the Li-LiCl environment but not with the Cl$_2$ environment. Carbon and graphite are chemically compatible with the Cl$_2$ environment, but not the Li-LiCl environment. Accordingly, workers in the Li|LiCl|Cl$_2$ system have been hampered in their search for insulators and insulated conductors compatible with the Li|LiCl|Cl$_2$ environment. Materials which generally resist the chemical environment do not meet the electrical needs of the cells and conversely materials which at least come close to meeting the cell's electrical needs are not resistant to the chemical environment. Accordingly, the insulators and insulated conductors must be devised which will satisfy the immediate needs of workers in this system until such time as the technology develops appropriate and acceptable materials which are both chemically and electrically compatible with the Li|LiCl|Cl$_3$ environment.

It is, therefore, an object of this invention to provide composite electrical insulator means and insulated conductor means which are sufficiently electrically and chemically compatible with the Li|LiCl|Cl$_2$ electrochemical environment to meet the mission requirements for electrochemical cells operating in this environment.

Briefly, this invention relates to substantially environmentally-inert insulator and insulated conductor means for use in the Li|LiCl|Cl$_2$ electrochemical system. More particularly, the insulators and insulated conductors of this invention comprise composites of different materials so arranged as to exploit the advantageous chemical and electrical properties of the materials while concurrently masking their undesirable properties.

More particularly this invention relates to substantially environmentally-inert insulators and conductors comprising composites of a substantially nonconductive aluminum nitride core and Cl$_2$-resistant conductive and nonconductive core-protective barriers for shielding the aluminum nitride from Cl$_2$ attack. In the case of the insulated conductor, Cl$_2$-inert and Li-inert conductors are joined together to form a continuous electrical path with the Cl$_2$-inert conductor shielding the Li-inert conductor from Cl$_2$ attack and the Li-inert conductor shielding the Cl$_2$-inert conductor from Li attack.

Figures 1, 2:
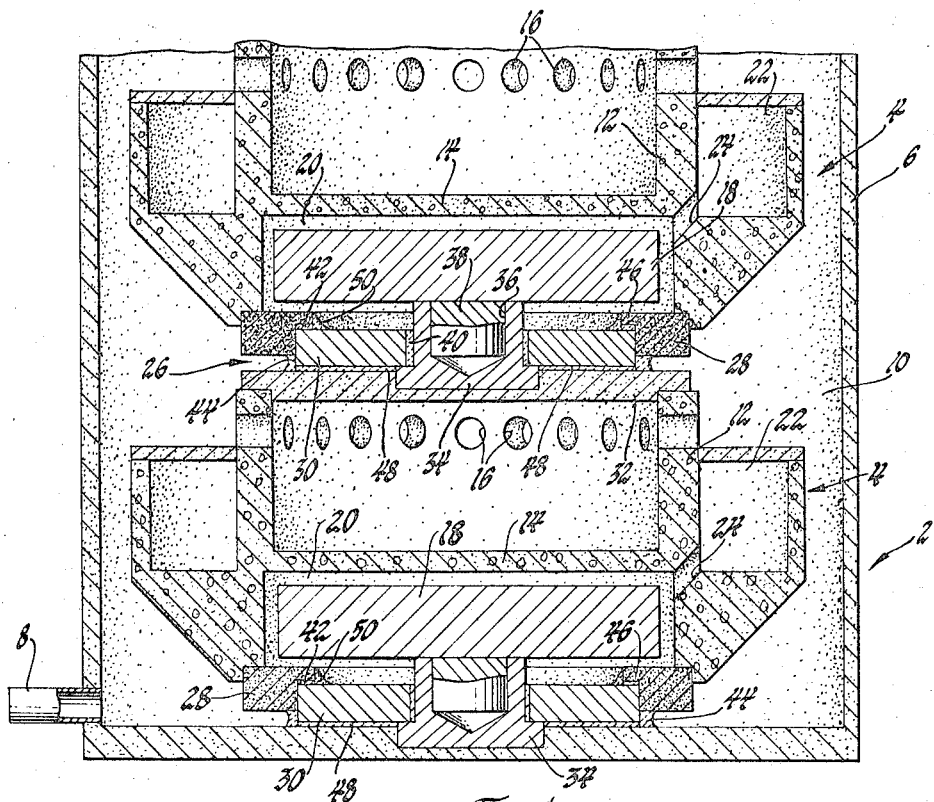
FIG. 1 is a sectioned, elevational view of a Cl$_2$-atmosphere lithium|lithium chloride|chlorine battery employing the improved insulator and insulated conductor means within the scope of this invention.
FIG. 2 is an enlarged, sectioned, elevational view of a portion of the battery shown in FIG. 1.

FIG. 1 depicts a battery 2 comprising a plurality of atmosphere-type cells 4 which are series connected within the battery housing 6. The battery housing 6 is comprised of a dense graphite or carbon material which is impermeable and chemically resistant to chlorine gas which forms the gaseous atmosphere surrounding the cells 4. The chlorine gas is provided under pressure through a typical inlet 8. Other means for providing the Cl$_2$ atmosphere, such as a thermally decomposable chloride, might be used in the alternative. The Cl$_2$ fills the void 10 and accordingly is exposed to the peripheral portions of the cells 4 and their connectors 26 (i.e., the conductors and insulators). The individual cells 4 comprise a cell body 12 which is made of porous carbon or graphite. A portion 14 of the body 12 forms the principal chlorine electrode and is, as shown, separated from the lithium electrode 18 by means of an electrolyte zone or gap 20. Chlorine is provided to the chlorine electrode 14 from the chlorine atmosphere in the void 10 by means of the chlorine ports 16.

The lithium electrode 18 is preferably of the matrix type such as disclosed and claimed in United States patent application Ser. No. 743,170 entitled Galvanic Cell with a Matrix Electrode filed on July 8, 1968 in the name of Gale M. Craig and assigned to the assignee of this invention. For purposes of a more detailed description of the matrix electrode 18, it is intended that the relevant portions of the aforesaid United States patent application Ser. No. 743,170 be herein incorporated by reference. Briefly, however, it can be said that the matrix electrode is a porous, lithium-wettable mass of conductive materials (e.g., stainless steel wire). The lithium is contained within the matrix. By an appropriate variation of the porosity and pore size profile within the matrix electrode 18, maximum utilization can be made of its storage capacity while at the same time lithium flow from within the interstices of the matrix to the active portion thereof can be controlled.

The electrolyte zone 20 is filled with lithium chloride. During discharge of the cell, additional lithium chloride is formed in the zone 20. The additional LiCl formed flows from the zone 20, via passages 24, into the LiCl April 20, 1971     G. M. CRAIG     3,575,720
INSULATOR MEANS FOR LITHIUM-CHLORINE HIGH TEMPERATURE BATTERY
Filed Feb. 3, 1969

INVENTOR.
Gale M. Craig
BY
Lawrence B. Plant
ATTORNEY second of said cells adjacent said first cell; said conductor comprising a composite of at least two different electrically conductive materials electrically contacting one another, the first of which materials is substantially inert to the attack of lithium and the second of which materials is substantially inert to the attack of chlorine, said first material electrically contacting the lithium electrode of said first cell and being substantially isolated on all sides from chlorine attack, said second material electrically contacting the chlorine electrode of said second cell and being substantially isolated on all sides from lithium attack; and a substantially Li-inert and $Cl_2$-inert electrical insulator means bonded to said conductive materials and electrically insulating said materials from the chlorine electrode of said first cell.

2. The cell as defined in claim 1 wherein said first material is comprised of a metal selected from the group consisting of molybdenum, nickel-cobalt rich iron alloys containing about 20% Ni, 17% Co, 0.27% Mn and the balance iron, and stainless steel and said second material is comprised of a material selected from the group consisting of carbon and graphite.

3. The cell as claimed in claim 2 wherein said insulator comprises aluminum nitride having at least one $Cl_2$-inert barrier layer positioned between it and said chlorine, said barrier comprising at least one material selected from the group consisting of carbon, graphite, alumina and beryllia.

4. A battery of electrochemical cells comprising a plurality of Li|LiCl|$Cl_2$ cells electrically series connected one to the other; a housing enclosing said cells; means for conducting electrical current to and/or from said cells; each of said cells having a lithium electrode, a chlorine electrode, means for conducting chlorine to and/or from said chlorine electrode, a LiCl-filled region between said electrodes, and means for accommodating any excess LiCl in said cells; insulator means between the lithium electrode and the chlorine electrode of each of said cells electrically isolating said electrodes one from the other; said insulator means comprising an aluminum nitride core contacting said LiCl in said region and a protective layer of $Cl_2$-inert material selected from the group consisting of carbon, graphite, alumina and beryllia covering selected portions of said core; said layer being isolated from lithium attack by said core and being interposed between said core and a chlorine containing environment to isolate said core from chlorine attack.

5. In a Li|LiCl|$Cl_2$ electrochemical cell having a housing, an electrode for said lithium, an electrode for said chlorine, a LiCl-filled region between said electrodes, means for introducing chlorine to said chlorine electrode and means for accommodating excess LiCl, the improvement comprising a substantially environmentally-inert, electrically conductive composite of at least two different electrical conductors for conducting current to and/or from said lithium electrode, the first conductor comprising a stud contacting said lithium electrode through said LiCl-filled region and formed from a metal selected from the group consisting of molybdenum, nickel-cobalt rich iron alloys containing about 20% Ni, 17% Co, 0.27% Mn and the balance iron, and stainless steel, the second conductor contacting said first conductor and comprising a material selected from the group consisting of carbon and graphite, an aluminum nitride ring circumscribing said stud and bonded to said conductors to electrically insulate said composite from said chlorine electrode, said first conductor being exposed only to a chlorine-free environment and said second conductor being exposed only to a lithium-free environment.

References Cited
UNITED STATES PATENTS

| | | | |
|---|---|---|---|
| 3,488,224 | 1/1970 | Craig | 136—86 |
| 3,496,023 | 2/1970 | Craig | 136—86 |

ALLEN B. CURTIS, Primary Examiner

H. A. FEELEY, Assistant Examiner